United States Patent

Nishino

[11] Patent Number: 5,963,685
[45] Date of Patent: Oct. 5, 1999

[54] CROSS-CONNECTION OF WAVELENGTH-DIVISION-MULTIPLEXED HIGH SPEED OPTICAL CHANNELS

[75] Inventor: Masaru Nishino, Tokyo, Japan

[73] Assignee: NEC Corporation, Tokyo, Japan

[21] Appl. No.: 08/889,051

[22] Filed: Jul. 7, 1997

[30] Foreign Application Priority Data

Jul. 5, 1996 [JP] Japan .................................. 8-176647

[51] Int. Cl.⁶ .................................................. H04J 14/02
[52] U.S. Cl. ............................ 385/24; 385/37; 359/124; 359/127; 359/130
[58] Field of Search ....................... 385/24, 37; 359/124, 359/127, 130

[56] References Cited

U.S. PATENT DOCUMENTS

| | | | |
|---|---|---|---|
| 4,821,255 | 4/1989 | Kobrinski | 370/3 |
| 5,726,785 | 3/1998 | Chawki et al. | 359/130 |
| 5,742,416 | 4/1998 | Mizrahi | 359/134 |
| 5,748,349 | 5/1998 | Mizrahi | 359/130 |

FOREIGN PATENT DOCUMENTS 7162904  6/1995  Japan ........................ 385/24

*Primary Examiner*—John D. Lee
*Assistant Examiner*—Victoria D. Hao
*Attorney, Agent, or Firm*—Sughrue, Mion, Zinn, Macpeak & Seas, PLLC

[57] ABSTRACT

A cross-connection device has two three-port optical circulators for being supplied with wavelength-division-multiplexed optical signals each having a plurality of wavelengths from respective input ports, a fiber grating mirror inserted between the three-port optical circulators, for reflecting only an optical signal having a certain wavelength and passing optical signals having other wavelengths, a fiber grating mirror controller for controlling the wavelength reflected by the fiber grating mirror, and two output ports for outputting cross-connected wavelength-division-multiplexed optical signals from the optical circulators. The fiber grating mirror controller controls the temperature and pressure applied to the fiber grating mirror to select the wavelength reflected by the fiber grating mirror. The fiber grating mirror may comprise a plurality of fiber grating mirrors for reflecting different wavelengths to cross-connect a desired number of optical signals of the supplied wavelength-division-multiplexed optical signals.

4 Claims, 2 Drawing Sheets

CROSS-CONNECTION OF WAVELENGTH-DIVISION-MULTIPLEXED HIGH SPEED OPTICAL CHANNELS

BACKGROUND OF THE INVENTION

1. Field of the Invention

The present invention relates to an optical communication system, and more particularly to a cross-connection device for use in an optical communication system employing wavelength-division-multiplexed optical signals.

2. Description of the Related Art

Cross-connection devices are used in optical communication systems for cross-connecting a plurality of wavelength-division-multiplexed optical signals inputted from a plurality of input ports, i.e., redistributing such optical signals depending on the destination information and outputting newly wavelength-division-multiplexed optical signals from respective output ports. Such cross-connection devices are disclosed in Japanese laid-open patent publication No. 7-162904 published Jun. 23, 1995 and U.S. Pat. No. 4,821,255, etc.

One typical prior cross-connection device is shown FIG. 1 of the accompanying drawings.

As shown in FIG. 1, the conventional cross-connection device comprises m input ports $101$~$10m$ for being supplied with respective wavelength-division-multiplexed optical signals each comprising multiplexed n different wavelengths $\lambda 1$~$\lambda n$, m demultiplexers $111$~$11m$ for demultiplexing the wavelength-division-multiplexed optical signals from the m input ports $101$~$10m$ into individual optical signals having the respective wavelengths $\lambda 1$~$\lambda n$, a routing circuit $120$ for cross-connecting a total of m×n optical signals including n optical signals outputted from the respective demultiplexers $111$~$11m$, m multiplexers $131$~$13m$ for multiplexing optical signals of n wavelengths $\lambda 1$~$\lambda n$ from the routing circuit $120$, and m output ports $141$~$14m$ for outputting wavelength-division-multiplexed optical signals from the multiplexers $131$~$13m$.

The routing circuit $120$ converts the m×n optical signals into optical signals of the same or other wavelengths depending on the destination information, and cross-connects the optical signals for thereby redistributing them in groups of m wavelength-division-multiplexed optical signals.

While the conventional cross-connection device can be incorporated in large-scale optical communication systems, it necessarily suffers an increase in circuit scale because it is required to divide inputted wavelength-division-multiplexed optical signals into optical signals of the respective wavelengths, cross-connect them, and multiplex them again for outputting wavelength-division-multiplexed optical signals.

If the number of wavelengths to be multiplexed is 4, then the multiplexers and demultiplexers cause a total of losses of 12 dB, 6 dB by the multiplexers and 6 dB by the demultiplexers, even with ideal filters used, resulting in a substantial reduction in the power of optical signals.

SUMMARY OF THE INVENTION

It is therefore an object of the present invention to provide a cross-connection device which will solve the problems of the conventional cross-connection devices, does not cause a reduction in the power of optical signals, and is relatively small in size and simple in structure.

According to the present invention, there is provided a cross-connection device comprising first and second input ports for being supplied with respective wavelength-division-multiplexed optical signals, a first optical circulator having a first port, a second port, and a third port, the first port being connected to the first input port, for outputting an optical signal supplied to the first port from the second port, outputting an optical signal supplied to the second port from the third port, and outputting an optical signal supplied to the third port from the first port, a second optical circulator having a first port, a second port, and a third port, the first port being connected to the second input port, for outputting an optical signal supplied to the first port from the second port, outputting an optical signal supplied to the second port from the third port, and outputting an optical signal supplied to the third port from the first port, fiber grating mirror means connected between the second port of the first optical circulator and the second port of the second optical circulator, for reflecting an optical signal having a selected wavelength and transmitting optical signals having other wavelengths, a first output port connected to the third port of the first optical circulator, a second output port connected to the third port of the second optical circulator, and wavelength control means for setting the selected wavelength to a predetermined wavelength.

The fiber grating mirror means may comprise a plurality of fiber grating mirrors for reflecting different wavelengths, respectively.

The wavelength control means may control temperature and pressure applied to the fiber grating mirrors to set the different wavelengths to predetermined lengths, respectively.

The cross-connection device of the above arrangement is capable of cross-connecting optical signals of the wavelength-division-multiplexed optical signals without dividing them with respect to their respective wavelengths. Consequently, the cross-connection device is relatively simple in structure and small in size.

Since the optical circulators and the fiber grating mirror or mirrors which are theoretically known to cause no power loss are employed to switch around optical signals of a certain wavelength or lengths, any power loss of optical signals which are handled by the cross-connection devices is greatly reduced.

If the fiber grating mirror means comprise a plurality of fiber grating mirrors for reflecting different wavelengths, then the cross-connection device is able to cross-connect a plurality of optical signals having respective different wavelengths.

The above and other objects, features, and advantages of the present invention will become apparent from the following description with references to the accompanying drawings which illustrate examples of the present invention.

DETAILED DESCRIPTION OF THE PREFERRED EMBODIMENTS

Figure 1:
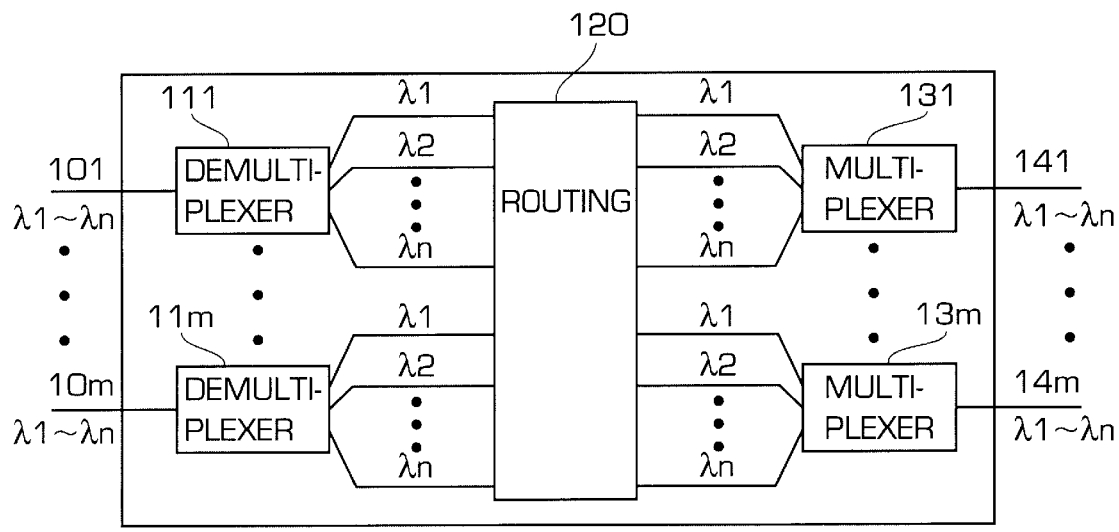
FIG. 1 is a block diagram of a conventional cross-connection device.
Figure 2:
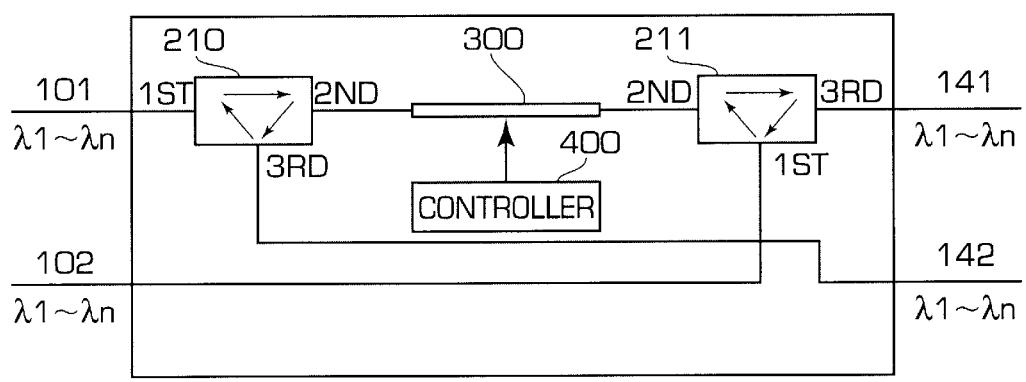
FIG. 2 is a block diagram of a cross-connection device according to a first embodiment of the present invention.

As shown in FIG. 2, a cross-connection device according to a first embodiment of the present invention comprises two input ports 101, 102 for being supplied with respective wavelength-division-multiplexed optical signals each comprising multiplexed n different wavelengths λ1~λn, two three-port optical circulators 210, 211 having first ports for being supplied with the wavelength-division-multiplexed optical signals from the respective input ports 101, 102, a fiber grating mirror 300 inserted between respective second ports of the three-port optical circulators 210, 211, a fiber grating mirror controller 400 for controlling the reflecting wavelength of the fiber grating mirror 300, and two output ports 141, 142 connected to third ports of the optical circulators 210, 211 for outputting cross-connected wavelength-division-multiplexed optical signals.

The fiber grating mirror 300 comprises a device for reflecting only an optical signal having a certain wavelength and passing optical signals having other wavelengths. The wavelength λ of the light that is reflected by the fiber grating mirror 300 is set to a desired value by controlling the temperature and pressure applied to the fiber grating mirror 300.

Operation of the cross-connection device shown in FIG. 2 will be described below.

A wavelength-division-multiplexed optical signal having wavelengths λ1~λn that is inputted from the input port 101 is supplied through the optical circulator 210 to the fiber grating mirror 300.

It is assumed that the fiber grating mirror controller 400 controls the temperature and pressure applied to the fiber grating mirror 300 to set the wavelength λ of the light that is reflected thereby to one λi of the wavelengths λ1~λn of the wavelength-division-multiplexed optical signal. Of the wavelength-division-multiplexed optical signal applied to the fiber grating mirror 300, only the optical signal having the wavelength λi is reflected by the fiber grating mirror 300 and returned to the optical circulator 210, and then outputted from the output port 142. The other optical signals having the wavelengths λ1~λn other than the wavelength λi are transmitted through the fiber grating mirror 300 to the optical circulator 211, and then outputted from the output port 141.

Similarly, of the wavelength-division-multiplexed optical signals supplied from the input terminal 102, the optical signal having the wavelength λi is reflected by the fiber grating mirror 300, and outputted through the optical circulator 211 from the output port 141. The other optical signals having the wavelengths λ1~λn other than the wavelength λi are transmitted through the fiber grating mirror 300 to the optical circulator 210, and then outputted from the output port 142.

Figure 3:
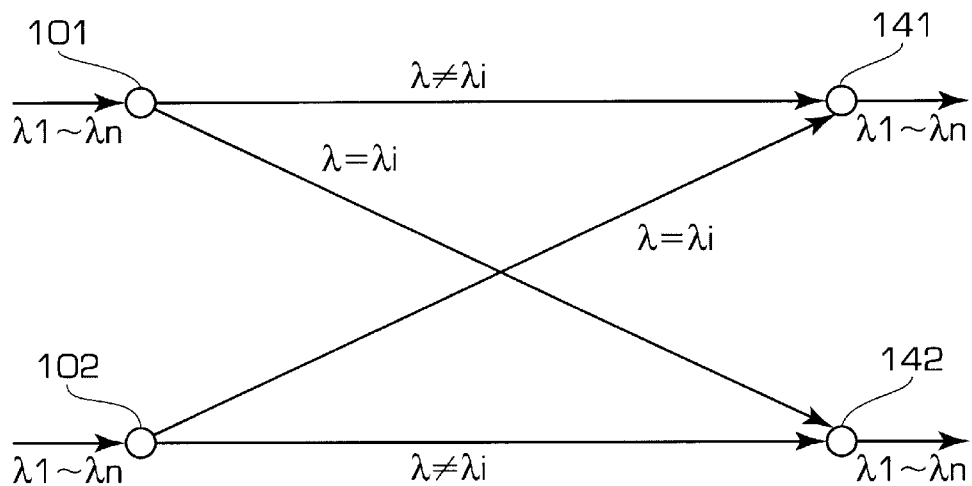
FIG. 3 is a diagram illustrating the manner in which optical signals of respective wavelengths are inputted and outputted.

Specifically, as shown in FIG. 3, of the two wavelength-division-multiplexed optical signals each having the wavelengths λ1~λn that are supplied from the respective input terminals 101, 102, only the optical signals having the wavelength λi are switched around and outputted from the output ports 141, 142. It is not necessary for an optical signal having the wavelength λi to be included in both the two wavelength-division-multiplexed optical signals supplied from the respective input terminals 101, 102. If an optical signal having the wavelength λi is included in one of the two wavelength-division-multiplexed optical signals supplied from the respective input terminals 101, 102, then the optical signal having the wavelength λi is transferred to the other wavelength-division-multiplexed optical signal, and outputted together with the other wavelength-division-multiplexed optical signal from either one of the output ports 141, 142.

If optical signals having a certain wavelengths do not need to be switched around, then the wavelength of the light that is reflected by the fiber grating mirror 300 it set to a wavelength λ that is not the same as either one of the wavelengths λ1~λn. In this case, the wavelength-division-multiplexed optical signals that are applied to the respective input terminals 101, 102 are outputted as they are from the output ports 141, 142, respectively.

Figure 4:
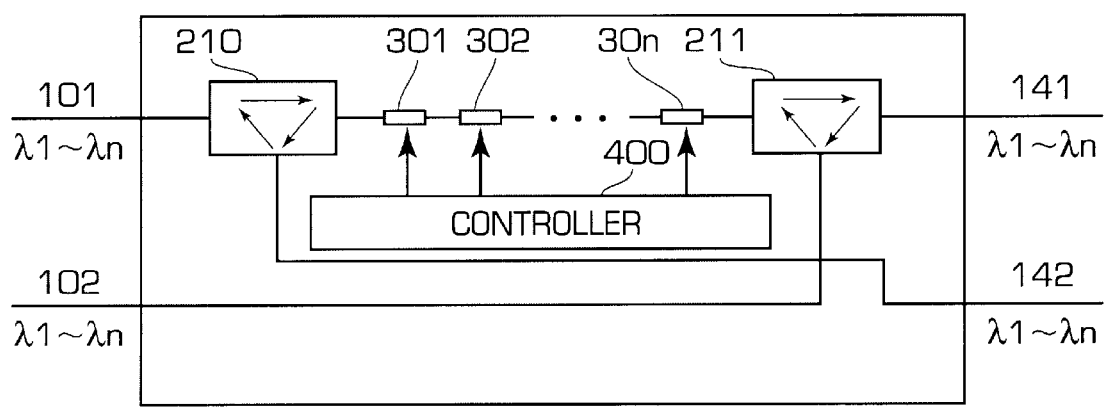
FIG. 4 is a block diagram of a cross-connection device according to a second embodiment of the present invention.

FIG. 4 shows a cross-connection device according to a second embodiment of the present invention. Those parts in FIG. 4 which are identical to those shown in FIG. 2 are denoted by identical reference numerals and will not be described in detail below. The cross-connection device according to the second embodiment has a plurality of n fiber grating mirrors 301, 302, . . . , 30n which reflect different wavelengths, respectively. The n fiber grating mirrors 301, 302, . . . , 30n are connected between the optical circulators 210, 211, and controlled by the fiber grating mirror controller 400.

With the cross-connection device according to the second embodiment, a plurality of optical signals having respective different wavelengths which are supplied from one of the input ports 101, 102 and reflected by the fiber grating mirrors 301, 302, . . . , 30n are returned to the same optical circulator 210 or 211, and outputted, together with optical signals having respective different wavelengths which are supplied from the other of the input ports 101, 102 and not reflected by the fiber grating mirrors 301, 302, . . . , 30n, from one of the output ports 141, 142.

The number of fiber grating mirrors 301, 302, . . . , 30n may be increased up to the number of wavelengths λ1~λn of the supplied wavelength-division-multiplexed optical signals. Consequently, it is possible to switch around a desired number of optical signals of the wavelength-division-multiplexed optical signals supplied from the input ports.

In each of the first and second embodiments described above, the optical circulators and the fiber grating mirror or mirrors which are theoretically known to cause no power loss are employed to switch around optical signals of a certain wavelength or lengths for thereby cross-connecting optical signals of wavelength-division-multiplexed optical signals without dividing the wavelength-division-multiplexed optical signals with respect to their wavelengths. Therefore, it is not necessary to convert the optical signals to electric signals. The cross-connection devices according to the first and second embodiments are relatively simple in structure and small in size, and can reduce any power loss of optical signals which are handled by the cross-connection devices.

It is to be understood that variations and modifications of the cross-connection devices disclosed herein will be evident to those skilled in the art. It is intended that all such modifications and variations be included within the scope of the appended claims.

What is claimed is:

1. A cross-connection device comprising:

first and second input ports for being supplied with respective wavelength-division-multiplexed optical signals;

a first optical circulator having a first port, a second port, and a third port, said first port being connected to the first input port, for outputting an optical signal supplied to said first port from said second port, outputting an optical signal supplied to said second port from said third port, and outputting an optical signal supplied to said third port from said first port;

a second optical circulator having a first port, a second port, and a third port, said first port being connected to the second input port, for outputting an optical signal supplied to said first port from said second port, outputting an optical signal supplied to said second port from said third port, and outputting an optical signal supplied to said third port from said first port;

fiber grating mirror connected between the second port of said first optical circulator and the second port of said second optical circulator, for reflecting an optical signal having a selected wavelength and transmitting optical signals having other wavelengths;

a first output port connected to the third port of said first optical circulator;

a second output port connected to the third port of said second optical circulator; and wavelength controller for setting said selected wavelength to a predetermined wavelength.

2. A cross-connection device according to claim 1, wherein said wavelength controller comprises a controller for controlling temperature and pressure applied to said fiber grating mirror to set said selected wavelength to said predetermined length.

3. A cross-connection device according to claim 1, wherein said fiber grating mirror comprises a plurality of fiber grating mirrors for reflecting different wavelengths, respectively.

4. A cross-connection device according to claim 3, wherein said wavelength controller comprises a controller for controlling temperature and pressure applied to said fiber grating mirrors to set said different wavelengths to predetermined lengths, respectively.

* * * * *